Jan. 29, 1963  J. M. DA PRATO ET AL  3,075,662
HAND TRUCK
Filed April 21, 1960  2 Sheets-Sheet 1
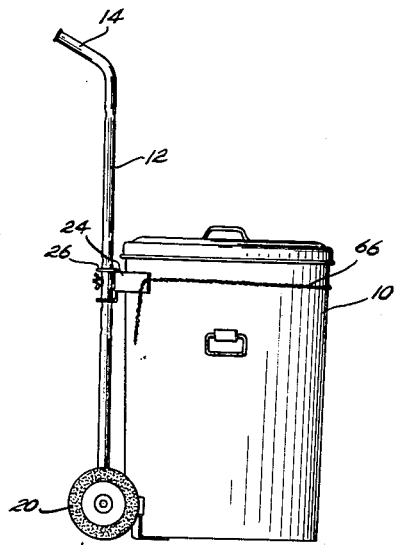
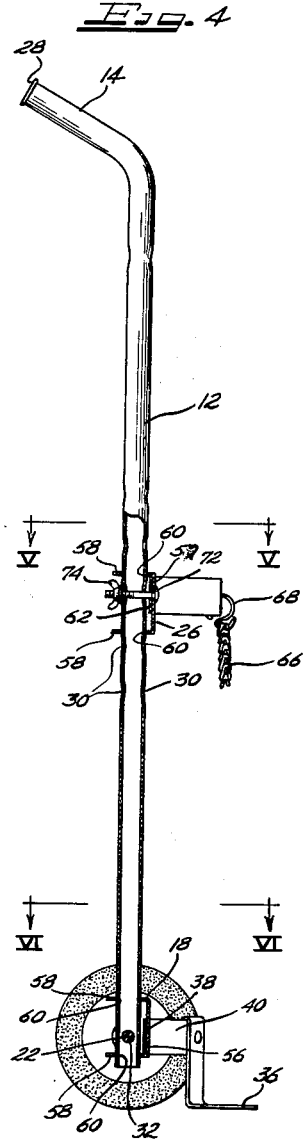
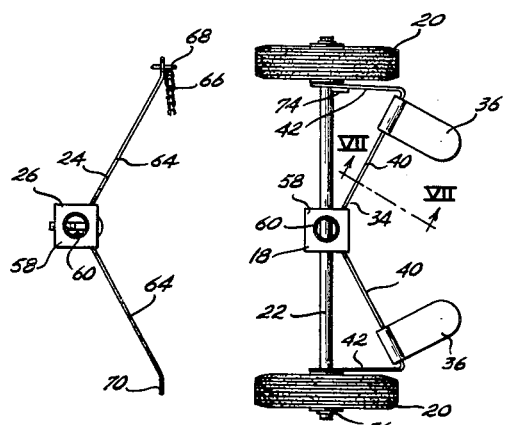
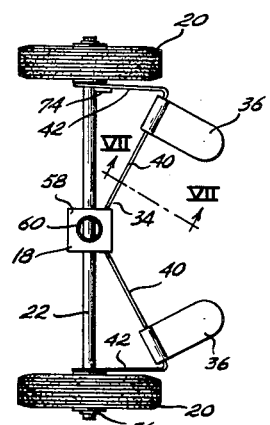
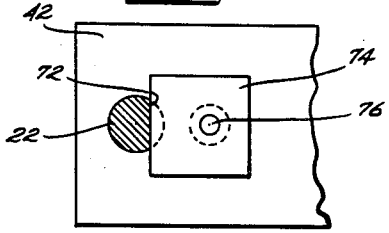
Inventors
JOSEPH M. DA PRATO
PAUL R. BEMOUNT
by Roy E. Petherbridge
Atty.

Jan. 29, 1963    J. M. DA PRATO ET AL    3,075,662
HAND TRUCK
Filed April 21, 1960    2 Sheets-Sheet 2
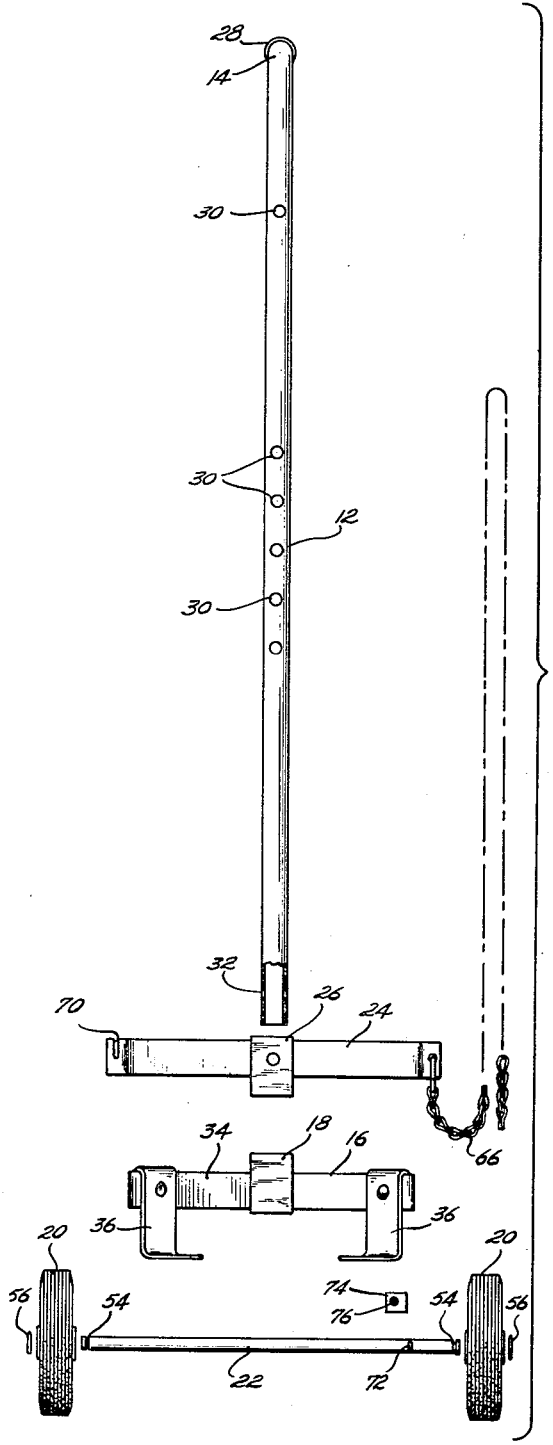
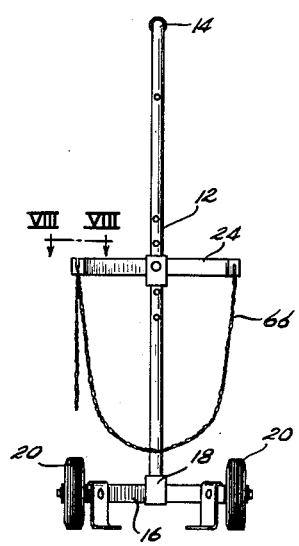
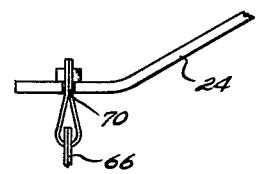
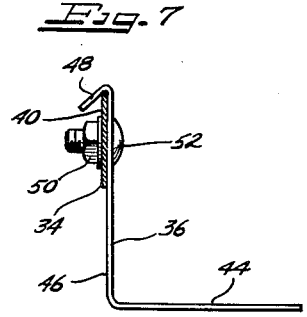
Inventors
JOSEPH M. DA PRATO
PAUL R. BEMOUNT
by Roy E. Petherbridge
Atty.

United States Patent Office 3,075,662
Patented Jan. 29, 1963

3,075,662
HAND TRUCK
Joseph M. Da Prato and Paul R. Bemount, Addison, Ill., assignors to Da Prato Manufacturing Company, Addison, Ill., a corporation of Illinois
Filed Apr. 21, 1960, Ser. No. 23,719
4 Claims. (Cl. 214—375)

This invention relates to hand trucks and more particularly, relates to hand trucks of simple, economical, and rugged construction, which are easily assembled.

An object of our invention is to provide a hand truck which is economical to manufacture and has the parts thereof so constructed and arranged, that on assembly, a rugged and strong hand truck results.

Another object of our invention is to provide a hand truck which may be shipped in knocked down condition, the parts of which are so constructed and arranged, that the hand truck may be easily assembled.

A further object of our invention is to provide a hand truck of strong rugged construction in which the parts thereof are so constructed that they mutually hold the parts of the truck in assembled position.

Another object of our invention is to provide a hand truck wherein a wheel shaft interlocks the various parts in fixed position.

A further object of our invention is to provide a hand truck constructed of simple parts which are held together by mutual inter-engagement.

A still further object of our invention is to provide a hand truck for carrying cans, such as garbage cans, provided with simple apparatus for holding the can on the cart.

Another object of our invention is to provide a hand truck wherein the body portion, base and shaft positively inter-engage each other to hold these parts in strong assembled position.

Another object of our invention is to provide a garbage can carrying truck which is simple and economical in construction, may be easily assembled and dis-assembled, may be shipped in knocked down condition, may stand by itself in a minimum of storage space, and which is strong in construction.

A further object of our invention is to provide a hand truck which has a wheel shaft that holds the truck assembled and means to lock the shaft against movement.

These and other objects and advantages will become more readily apparent as the description proceeds and is read in conjunction with the accompanying drawings in which;

FIG. 1 is a side elevational view of the hand truck of our invention, showing a garbage can mounted thereon;

FIG. 2 is a front elevational view of the hand truck of our invention, showing the garbage can removed;

FIG. 3 is an exploded view showing parts of the hand truck in dis-assembled position.

FIG. 4 is an enlarged elevational view of the hand truck, similar to FIG. 1, but with parts of the hand truck shown in section.

FIG. 5 is a view taken on line V—V of FIG. 4;

FIG. 6 is a view taken on line VI—VI of FIG. 4;

FIG. 7 is a view taken on line VII—VII of FIG. 6;

FIG. 8 is an enlarged view taken on line VIII—VII of FIG. 2 and shows the chain locking mechanism;

FIG. 9 is an enlarged detail view showing the apparatus for locking the wheel shaft against movement.

Referring now to the drawings, a preferred embodiment of a hand truck of our invention will be described.

The hand truck of our invention is adapted for multiple uses among which is its use as a container carrier. In particular, it lends itself to carrying cans, such as garbage cans and may be used as an industrial hand truck, or as a household hand truck. Referring to FIG. 1, we have shown the hand truck of our invention in conjunction with a garbage can 10, mounted in place thereon. Due to its low cost of manufacture and ease of assembly, the hand truck of our invention has wide appeal for use as a household utility cart and due to these features as well as its rugged construction, the hand truck has wide applications as an industrial truck.

Referring to FIGS. 2 and 3, it will be seen that the hand truck of our invention comprises a body portion 12, which is an elongated hollow tube having a handle portion 14 at its upper end. Handle portion 14 is disposed at an angle to the main part of body 12. As seen in FIG. 2, a base assembly 16 is provided at the lower end of body portion 12. As will be hereinafter described a bracket 18 holds base assembly 16 on body 12. A pair of wheels 20, are provided and these fit on shaft 22. Wheels 20 are provided with bearings, not shown in the drawings, so that these wheels rotate freely about shaft 22.

As seen in FIGS. 1, 2 and 3, a support assembly 24 is provided which is held in place on body portion 12 by bracket 26 in a manner hereinafter described.

With reference to FIGS. 3 and 4 in particular, the construction of body portion 12 will now be described. As previously stated body portion 12 is preferably made of hollow tubing, since this affords sufficient strength and rigidity, and handle portion 14 is provided at its upper end. Since the operator's hand will contact handle portion 14, a plug 28 is provided on the upper end to close off the tubing. Intermediate of its length, body portion 12 is provided with a series of bores 30, which extend diametrically through the tubing. Near its lower end, body portion 12 is provided with a bore 32. As will be hereinafter explained bore 32 is slightly larger than the size of shaft 22, whereby shaft 22 may be inserted within the bore.

The construction of base assembly 16 can best be understood by referring to FIGS. 3, 4, 6 and 7. In the form shown, base assembly 16 comprises a one piece strap 34 and two identical supports 36. Strap 34 is symmetrical about its center, and, as can only be seen in FIG. 4, has a central flat portion 38. Extending outwardly from its center, strap 34 has angularly disposed sections 40. The outer ends of the strap are turned rearwardly for engagement with shaft 22 and these shaft engaging portions are indicated at 42 in FIG. 6. Holes are provided in strap 34 near the ends of shaft engaging portions 42 and these holes have a diameter slightly larger than shaft 22 so that the shaft may fit therein. These holes are not shown in the drawings but the position thereof can be understood by reference to FIG. 6 and FIG. 4.

The details of construction of supports 36 may be understood by referring to FIG. 7 of the drawings. Supports 36 are secured to and carried by strap 34 in the angularly disposed sections 40. These supports have a horizontal portion 44 and a vertical portion 46. The upper ends of the supports have a flange 48 formed thereon at an angle to vertical portion 46, which flange portion overlies strap 34. Supports 36 are secured to strap 34 by nut 50 and bolt 52, or by any other conventional means, such as riveting or welding.

As seen in FIG. 3, shaft 22 is provided near each end with an annular depression 54. After the hand truck is assembled, as will be hereinafter explained, the wheels 20 are held on shaft 22, and in fact, the entire hand truck assembly is held and kept together, by means of O-rings 56 (see FIG. 3) which fit within annular depressions 54.

As previously stated, base assembly 16, is connected to body portion 12 by bracket 18. The construction of bracket 18 can best be understood by referring to FIGS. 4 and 6. Bracket 18 is U shaped in construction and has a vertical front face 57 and horizontal leg portions 58. Each of the leg portions has a hole therein of a size to receive body portion 12. These holes are indicated at 60 in FIG. 4 and in FIG. 6.

Bracket 26 for support assembly 24 is the same as bracket 18 and therefore on FIGS. 4 and 5, the vertical front face is indicated at 57 and the horizontal leg portions indicated at 58. The aligned holes 60 for receiving body portion 12 may be seen in FIG. 4. In addition, bracket 26 has a hole in its vertical front face as will be hereinafter explained.

Support 24 is in the form of a strap and has a central flat portion 62 (see FIG. 4) and angularly disposed sections 64 as best seen in FIG. 5. In the form shown the outer ends of support assembly 24 are flat.

One of the features of our invention is to provide a simple and yet positive means of holding a container on the hand truck. This is accomplished by means of a chain or other flexible member. In the drawings, this chain is indicated at 66. Chain 66 has one end thereof secured to one end of support assembly 24 and in the drawings we have shown a wire ring 68 for this purpose. Referring to FIGS. 5 and 8, it will be seen that the other end of support assembly 24 has a notch 70 provided therein. As seen in FIG. 8, notch 70 receives chain 66 and holds the same therein.

Support assembly 24 is mounted on body portion 12 by means of bracket 26. Support assembly 24 has a hole formed in central flat portion 62 similar to the hole formed in the vertical front face of bracket 26. As shown in FIG. 4, a bolt 72 passes through the hole in central flat portion 62 and bracket 26 and also passes through bores 30 of body portion 12. A wing nut 74 is threadably received on bolt 72 to connect and hold the assembly together.

Shaft 22 extends through shaft engaging portions 42, and base 32 of body 12. If this is free to rotate wear would occur and produce grooves in the shaft and enlarge the supporting holes. Such wear would cause poor operation. Also shaft 22 should be locked against lengthwise movement to prevent wobbling of the wheels and cart. To this end shaft 22 is locked to support 16. As seen in FIG. 9 shaft 22 has a key slot formed therein with a flat bottom. A key 74 is secured by a screw 76 to shaft engaging portion 42 of support 16. The flat end of the key fits in key slot 72 and this arrangement firmly holds the shaft against any movement.

For many reasons and in order to centrally manufacture and nationally distribute a product of this type, it is very important that the product be capable of shipment in a knocked down condition. It is equally important that the hand truck be capable of ready assembly when it reaches the household or other points of its intended use. An important feature of our invention resides in the construction by which the hand truck may be easily and quickly assembled without the use of any specialized tools or tools difficult for an unskilled person to use. The truck construction that we have conceived notably achieves this result.

The simplicity of assembly and steps of assembly will now be described:

The parts of the hand truck will be shipped in the disassembled condition as indicated in FIG. 3. The first step in assembly is to place bracket 26 over support assembly 24. The lower end of body portion 12 is then passed through aligned holes 60 in bracket 26 and the bracket and support assembly moved upwardly on the body portion. Bolt 72 can now be inserted through bracket 26, support assembly 24, and appropriate bores 30 in body portion 12. The support assembly 24 and bracket 26 can then be securely locked to body portion 12 by means of wing nut 74.

Bracket 18 is next placed over base assembly 16 and the lower end of body portion 12 passed through holes 60 in the bracket. Next shaft 22 is then moved lengthwise through the shaft receiving hole in one of the shaft engaging portions of strap 34. When the end of shaft 22 reaches the side of body portion 12, the body portion is then raised or lowered as required within bracket 18, until bore 32 is aligned with shaft 22. Shaft 22 may then slide through bore 32 of the body portion and its sideways movement is continued until the end of the shaft passes through the hole in the other shaft engaging portion 42 of strap 34. Key 74 is placed in key slot 72 and screw 76 tightened to secure the shaft in place. The ends of shaft 22 extend beyond the shaft engaging portions 42 of the base assembly and wheels 20 are placed on the ends of shaft 22. To lock the entire assembly together, rings 56 are now snapped over the ends of shaft 22 into annular depressions 54. Thus the entire assembly is completed.

Not only is it important that the hand truck of our invention is capable of easy assembly, but it is equally important that the hand truck be of strong rugged construction, because trucks of this type receive abuse in operation. To this end, it should be noted that body portion 12 firmly engages bracket 18 because of the passage of the body portion through the aligned bores 60 in the bracket. In addition, body portion 12 engages shaft 22 due to the passage of the latter through the body portion. Base assembly 16 is firmly and positively held in place due to the passage of shaft 22 through the spaced shaft engaging portions 42 and in addition, due to the engagement of strap 34 with bracket 18. Due to this inter-locking or inter-engagement assembly, the entire structure is rigid and secure.

Once the O-rings are snapped in place, the truck cannot become disassembled. While the rings 56 are positive in their operation and sufficiently strong to hold the assembly together, it should be appreciated that there will be only small force exerted against these O-rings even under abusive use conditions which could, or would, tend to cause the parts to come apart.

By referring to FIGS. 2 and 6, it will be noted that wheels 20 have no tendency to wobble on shaft 22 or travel along the shaft because they are trapped on the shaft between rings 56 and shaft engaging portions 42 of the base assembly. The shaft is held secure against movement by key 74.

In some cases it may be advisable to dis-assemble the hand truck of our invention. This may be easily done by first removing rings 56 and then disassembling the hand truck in a reverse order to that described for assembling the hand truck.

In a hand truck of a type we propose for multiple uses, the size of the container, can, or other material carried by the hand truck varies greatly. In addition, while articles may be carried on the hand truck without being positively secured thereon, it is both dangerous and inconvenient to do this. We have provided a simple, economical and practical solution to this problem. As previously explained, chain 66 is secured to one end of support assembly 24. This chain is flexible and of a length to completely circumscribe any container or load likely to be carried by the hand truck. In order to secure the container, or load on the truck, the supports 36 of base assembly 16 are placed under the container as seen in FIG. 1. Chain 66 is then passed around the container and drawn tight. An appropriate link of the chain is then dropped into notch 70 of support assembly 24. This positively and securely holds the container on the hand truck. To remove the container, it is only necessary to lift chain 66 out of slot 70.

In order to adjust support assembly 24 for containers or loads of various heights, the series of bores 30 are provided along the length of body portion 12.

As seen in the drawings the truck will stand upright with the wheels and horizontal portions 44 of supports 36 balancing and supporting the truck. It will be noted that the truck will store in a small space and need not be leaned against a wall.

Having described a preferred embodiment of our invention, it should be readily apparent that the hand truck of our invention is extremely economical in construction, may be shipped in knocked down condition and may be easily assembled. When the hand truck is assembled, the inter-locking action of the parts provides a strong and rugged truck. The adjustable support assembly is likewise securely and positively assembled even though adjustable and the novel means for securing the load on the hand truck is both simple in construction and positive in operation. The hand truck of our invention is believed to accomplish the objects and advantages heretofore stated.

It should be appreciated that various changes and modifications may be made in the hand truck as shown in the drawings, but which do not depart from the scope of our invention which is defined in the appended claims.

We claim:

1. A hand truck which is held in assembled condition by inter-engagement of the parts, comprising a tubular body portion having a transverse bore through the lower end thereof, a base assembly supported at the lower end of said body portion and connected therewith, said base assembly having a U-shaped bracket with aligned openings through the sides of said bracket, said tubular body portion passing through said aligned openings in said bracket, said transverse bore in said body portion being disposed between the sides of said U-shaped bracket, said base assembly including a strap member having a central portion disposed within said bracket and having the ends thereof spaced away from said bracket, said ends of said strap member being provided with shaft receiving openings, a shaft disposed within said shaft receiving openings of said strap member and through said transverse bore of said body portion, a wheel mounted on each end of said shaft, means to lock said wheels on said shaft.

2. Apparatus as defined in claim 1 wherein said means to lock said wheels on said shaft comprise resilient rings and said wheels are trapped against movement along said shaft between said resilient rings and said ends of said strap member.

3. Apparatus as defined in claim 1 and including a support assembly for said truck having a centrally disposed bracket portion and a second strap member, said centrally disposed bracket portion comprising a U-shaped member having aligned bores in the sides thereof through which said body portion passes, said second strap member having ends thereof spaced away from said bracket portion, and a flexible member releasably secured between the ends of said second strap member, said flexible member being adapted to surround the load carried by said hand truck.

4. Apparatus as defined in claim 1 and including a support assembly for said truck having a centrally disposed bracket portion and a second strap member, said centrally disposed bracket portion comprising a U-shaped member having aligned bores in the side thereof through which said body portion passes, said second strap member having ends thereof spaced away from said bracket portion, a flexible member secured between the ends of said second strap member, said flexible member being adapted to surround the load carried by said hand truck, said flexible member having a fixed connection to one of the ends of said second strap member, the other end of said second strap member having a slot therein, said flexible member being releasably engageable in said slot.

References Cited in the file of this patent

UNITED STATES PATENTS

| | | |
|---|---|---|
| D. 146,419 | Peterson | Feb. 25, 1947 |
| 1,300,567 | Brorby | Apr. 15, 1919 |
| 1,527,973 | Gilbert | Mar. 3, 1925 |
| 2,245,543 | Landsman et al. | June 10, 1941 |
| 2,507,855 | Drew | May 16, 1950 |
| 2,574,825 | Guild | Nov. 13, 1951 |
| 2,784,856 | Jordan | Mar. 12, 1957 |